United States Patent [19]

Hill

[11] 4,093,692
[45] June 6, 1978

[54] MELT EXTRUSION PROCESS

[75] Inventor: Donald R. J. Hill, Houston, Tex.

[73] Assignee: Gulf Oil Corporation, Pittsburgh, Pa.

[21] Appl. No.: 779,873

[22] Filed: Mar. 21, 1977

[51] Int. Cl.² ............................................. B29C 17/07
[52] U.S. Cl. ........................................ 264/95; 264/98; 264/176 R; 526/106; 526/352
[58] Field of Search ................. 264/95, 98, 99, 176 R, 264/94; 526/106, 352

[56] References Cited

U.S. PATENT DOCUMENTS

| 2,930,789 | 3/1960 | Kerber | 526/106 |
| 3,574,808 | 4/1971 | Matthews | 264/98 |
| 3,784,661 | 1/1974 | Schaul et al. | 264/98 |

OTHER PUBLICATIONS

"Gains Are Made in Extruding HMW PE Powders", Plastics Technology – vol. 21, No. 2, 2–1975, Cancio et al., pp. 40–44.

Primary Examiner—Jeffery R. Thurlow
Attorney, Agent, or Firm—Richard L. Kelly

[57] ABSTRACT

This application discloses a melt extrusion process for preparing articles of manufacture of improved properties from very high molecular weight linear ethylene polymers having an annealed density greater than about 0.94 gms/ml. The ethylene polymer employed in the process has melt flow properties such that the relationship between its slope parameter (S) and its apparent melt viscosity in poises at 1 sec.$^{-1}$ ($A_o$) is defined by the formula:

$$S \geq 0.0830 A_o - 0.442$$

where S is the negative slope of the curve obtained from a plot of the natural logarithm of the polymer's apparent melt viscosity in poises versus the natural logarithm of the apparent shear rate in sec.$^{-1}$ at 190° C, said slope measured at 10 sec.$^{-1}$; and where $A_o$ is the natural logarithm of the polymer's melt viscosity in poises measured at 1 sec.$^{-1}$ at 190° C. The ethylene polymer has an S value in the range of about 0.61 to about 0.90 and an $A_o$ value in the range of about 12.0 to about 14.5. The ethylene polymer is extruded at a shear stress of less than about $3 \times 10^6$ dynes/cm².

6 Claims, 4 Drawing Figures

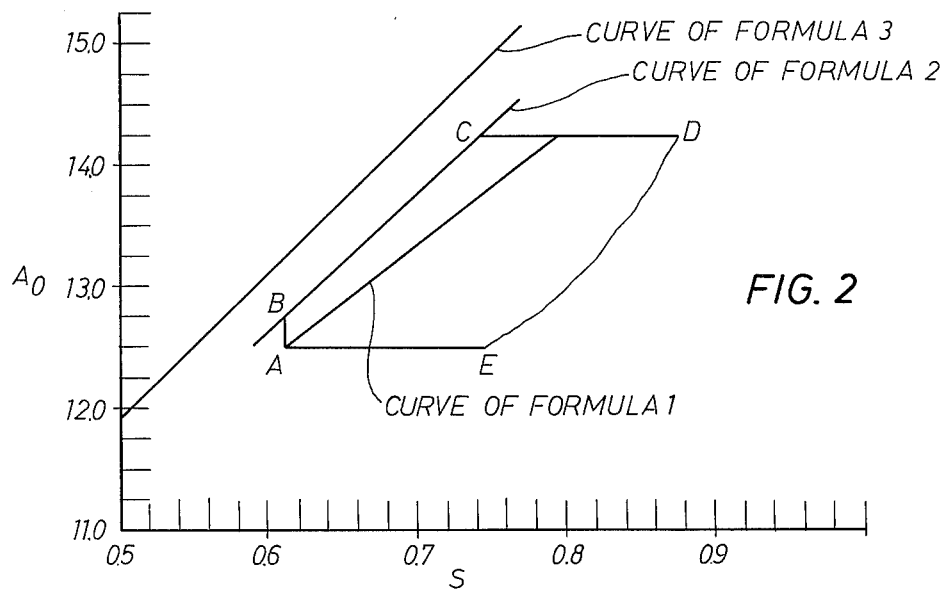
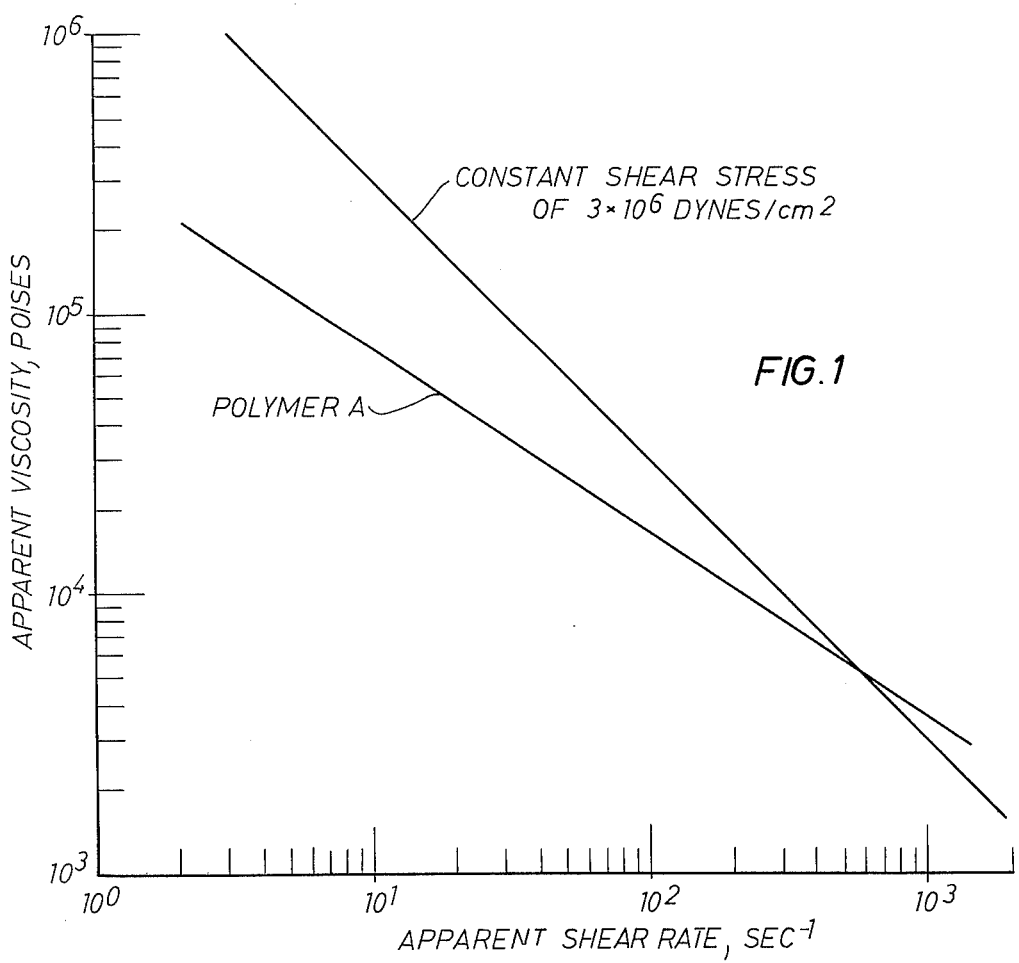

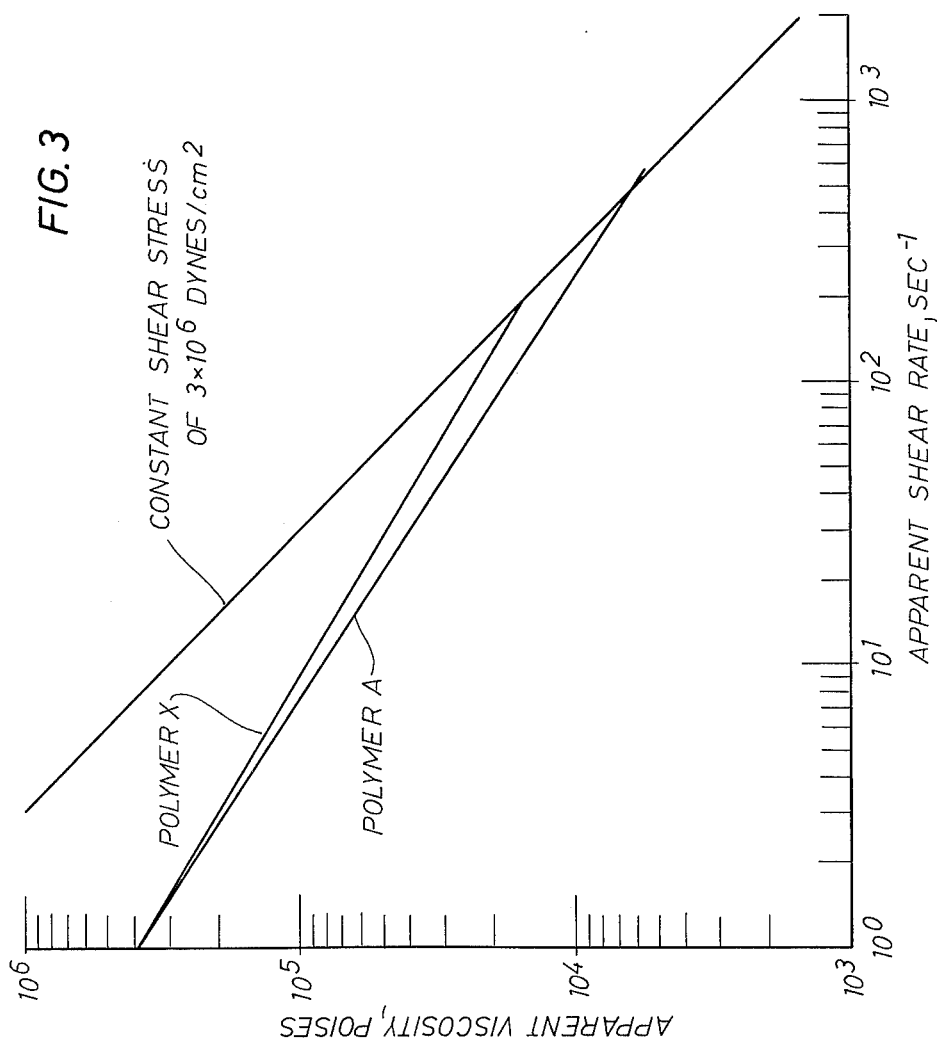

MELT EXTRUSION PROCESS

BACKGROUND OF THE INVENTION

In the fabrication of articles of manufacture such as film, blow molded articles, and the like from thermoplastic polymers, the fabricator frequently is required to make compromises between optimum physical properties in the ultimate article and the cost and ease of fabrication. This results from the fact that many strength properties such as tensile strength and impact strength increase with the molecular weight of the polymer. The melt viscosity of a polymer also increases with its molecular weight. Thus, if a fabricator prepares the article of manufacture from a higher than normal molecular weight polymer, he must extrude a polymer having higher than normal melt viscosity. This will necessitate either extruding the polymer at a higher than normal temperature, or supplying more than normal power to the extruder, or extruding at a slower than normal rate, or some combination thereof. Any of these adjustments increases the manufacturing cost of the article of manufacture.

The factors discussed in the paragraph above have their principal effect on the cost of manufacturing the desired article of manufacture. In some situations, however, the melt viscosities of certain polymers having molecular weights above specified values are so high as to actually prevent fabrication of articles by melt extrusion processes. This is particularly the case with very high molecular weight linear ethylene polymers having densities greater than about 0.94 gms/ml. The difficulties in extruding such polymers are discussed by L. V. Cancio and R. J. Joyner in their paper GAINS ARE MADE IN EXTRUDING HMW PE POWDERS, *Plastics Technology*, February 1975, pp 40–44.

Most extrusions of high density linear ethylene polymers are carried out under conditions of smooth laminar flow with the snear stress on the polymer at the die orifice being less than about $3 \times 10^6$ dynes/cm²*.

*The numerical value of shear stress is determined by multiplying the polymer's apparent melt viscosity in poises by the apparent shear rate in reciprocal seconds.

However, when a fabricator attempts to extrude very high molecular weight high density linear ethylene polymers at conventional rates of extrusion, significantly different results are observed. By reason of the polymer's high melt viscosity, the shear stress on the polymer at the die orifice will exceed about $3 \times 10^6$ dynes/cm². Under these conditions, the flow of polymer through the die ceases to be smooth and laminar. The extrudate surface becomes rough and nonuniform and the physical properties of the extruded article are reduced significantly. This phenomenon frequently is referred to in the art as melt fracture. The apparent melt viscosities of many very high molecular weight linear ethylene polymers are so high that they simply cannot be extruded at significant rates without encountering melt fracture. For this reason, many very high molecular weight linear ethylene polymers are fabricated by methods other than melt extrusion.

BRIEF DESCRIPTION OF DRAWINGS

FIG. 1 is a plot of the melt flow properties of a high density linear ethylene polymer suitable for use in the process of the invention.

FIG. 2 is a plot showing the relationship between S and $A_o$ values for different types of linear ethylene polymers, certain of which are suitable for use in the invention and others of which are not.

FIG. 3 is a plot of the melt flow properties of two polymers having identical melt viscosities measured at 1 sec.$^{-1}$ at 190° C ($A_o$), but having different slope parameters S.

SUMMARY OF THE INVENTION

Figure 4:
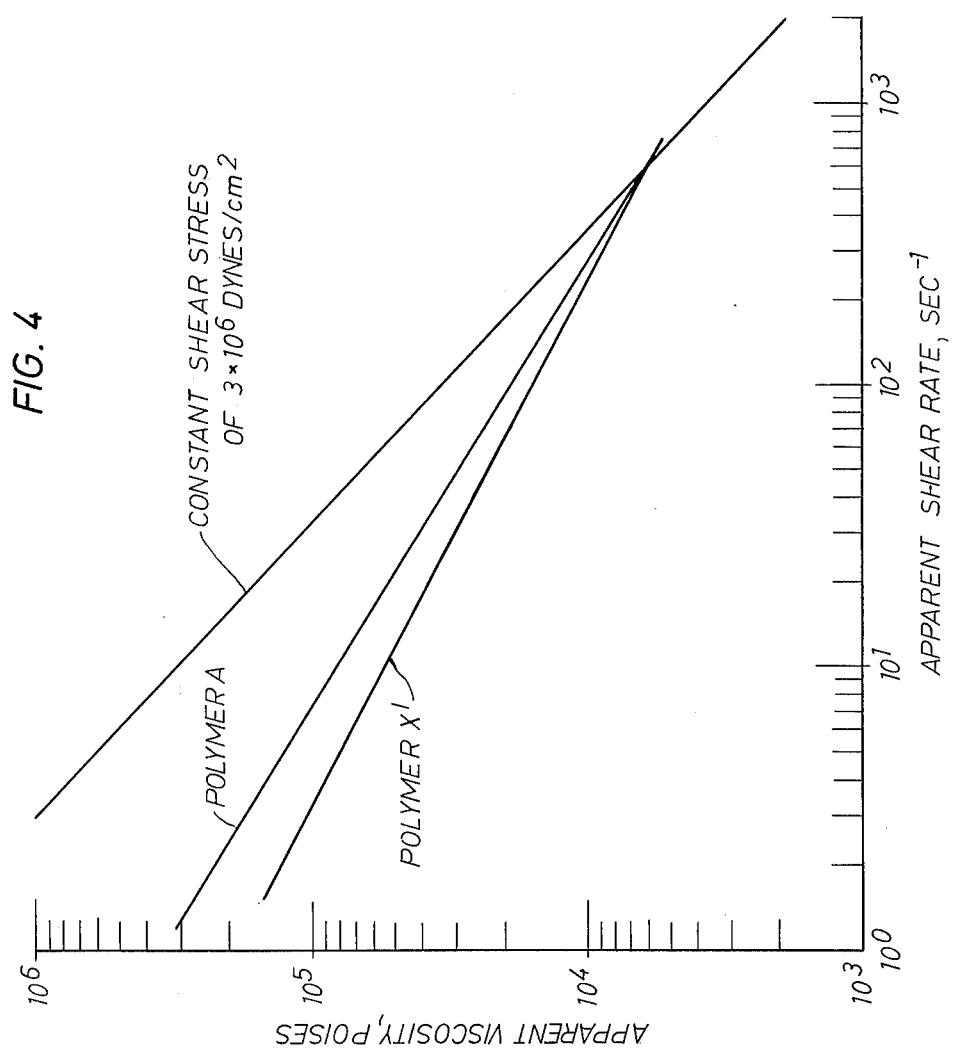
FIG. 4 is a plot of the melt flow properties of two ethylene polymers having different S and $A_o$ values.

In accordance with the present invention, the applicant has discovered a method for preparing melt extruded articles of manufacture from very high molecular weight linear ethylene polymers. The process involves melt extruding an ethylene polymer having an annealed density greater than about 0.94 gms/ml and preferably greater than about 0.96 gms/ml and unusual melt flow properties such that the relationship between its slope parameter (S) and its apparent melt viscosity in poises at 1 sec.$^{-1}$ ($A_o$) is defined by the formula:

$$S \geq 0.0830 A_o - 0.442^*$$

where S is the negative slope of the curve obtained from a plot of the natural logarithm of the polymer's apparent melt viscosity in poises versus the natural logarithm of the apparent shear rate in sec.$^{-1}$ at 190° C, said slope measured at 10 sec.$^{-1}$; and where $A_o$ is the natural logarithm of the polymer's apparent viscosity in poises measured at 1 sec.$^{-1}$ at 190° C;

*The development of this formula, its significance, and the meanings of the terms S and $A_o$ are subsequently set forth in greater detail.

The ethylene polymer has an S value in the range of about 0.61 to about 0.90 and an $A_o$ value in the range of about 12.0 to about 14.5. The extrusion is carried out at a shear stress of less than $3 \times 10^6$ dynes/cm².

The fabricated articles prepared by the process of the invention have properties superior to corresponding articles of manufacture prepared from linear ethylene polymers by previously known melt extrusion processes.

DETAILED DESCRIPTION OF THE INVENTION

FIG. 1 illustrates the melt flow properties of a typical high density linear ethylene polymer employed in the process of the invention. This polymer is identified as Polymer A and its preparation is subsequently described in Example 1. The polymer's apparent melt viscosities at various apparent shear rates were determined in a capillary rheometer operated under conditions of constant shear. The data are plotted on a log-log scale and show the change in apparent melt viscosity (in poises) with apparent shear rate (in reciprocal seconds). When the data are plotted in this manner, an essentially linear curve is obtained. The second curve shown is a curve showing a constant shear stress of $3 \times 10^6$ dynes/cm². The shear stress value of each point on this line is the product obtained by multiplying the apparent melt viscosity in poises by the apparent shear rate in reciprocal seconds.

The significance of the constant shear stress line is that when an ethylene polymer is being extruded under any conditions of apparent melt viscosity and apparent shear rate to the left of the constant shear stress line, the shear stress on the extruded polymer at the die orifice is less than $3 \times 10^6$ dynes/cm$^2$. When the polymer is extruded at shear stresses below this level, the polymer exhibits smooth laminar flow which is required to obtain extruded articles of good properties. If a polymer is extruded under any conditions lying to the right of the constant shear stress line, the polymer being extruded through the orifice no longer exhibits smooth laminar flow. The polymer extruded under these conditions exhibits melt fracture and the quality of the extrudate is poor.

It will be noted that the constant shear stress line and the line representing the melt flow of Polymer A have different slopes and intersect at a shear rate of approximately 420 sec.$^{-1}$. Thus Polymer A will exhibit smooth laminar flow at any shear rate of less than about 420 sec.$^{-1}$ and can be extruded at such shear rates without exhibiting melt fracture. In operation of the process of the invention, the ethylene polymer normally will be extruded at a shear rate close to the rate at which the melt flow line for the polymer intersects with the constant shear stress line of $3 \times 10^6$ dynes/cm$^2$ to obtain high through put rates.

Melt flow curves of the type shown in FIG. 1 illustrate the shear thinning or pseudoplastic flow of an ethylene polymer. The magnitude of the slope of the curve quantitatively measures the degree of shear thinning or pseudoplastic flow of the ethylene polymer under consideration.

For the purposes of the present specification, the applicant will designate the slope of such melt flow curves as a "slope parameter," which is represented by S, and which is the negative slope of a plot of the natural logarithm of the polymers' apparent viscosity versus the natural logarithm of the apparent shear rate; such slope being measured at an apparent shear rate of 10 sec.$^{-1}$ and at a temperature of 190° C. The shear thinning or pseudoplastic flow of an ethylene polymer is proportional to the magnitude of its S value. Polymer A illustrated in FIG. 1 has an S value of 0.65.

For any family of ethylene polymers, the absolute value of S is a function of the polymer's melt viscosity level. The change of S with melt viscosity level can be characterized by use of a "viscosity reference parameter" which will be represented by $A_o$ and which is the natural logarithm of the polymer's apparent melt viscosity at 1 sec.$^{-1}$.

The best curve for the relationship between S and $A_o$ for the most preferred ethylene polymers employed in the present invention, valid for S values within a range of about 0.61 to about 0.90 and $A_o$ values within a range of about 12.3 to about 14.25, is defined by Formula I:

$$S = 0.106 A_o - 0.71 \pm 0.02 \qquad (1)$$

Typical experimental S and $A_o$ values for several ethylene polymers suitable for use in the invention are set forth in Table I.

TABLE I

| Polymer Identification | $A_o$ | S |
|---|---|---|
| A | 12.7 | 0.65 |
| B | 12.5 | 0.68 |
| C | 12.8 | 0.66 |
| D | 13.1 | 0.67 |
| E | 13.3 | 0.71 |
| F | 13.5 | 0.73 |
| G | 13.8 | 0.75 |

TABLE I-continued

| Polymer Identification | $A_o$ | S |
|---|---|---|
| H | 14.2 | 0.79 |

With the ethylene polymers preferred for use in the invention, where experimentally determined S values depart from the values calculated by Formula 1, the experimentally determined S values are nearly always larger than the calculated S values. Such departures from Formula 1 occur most frequently when the $A_o$ values are below about 13.5.

A somewhat broader relationship between S and $A_o$ values of all of the ethylene polymers which can be employed in the invention, valid for S values within a range of about 0.60 to about 0.90 and for $A_o$ values within a range of about 12.0 to about 14.5, is defined by Formula 2:

$$\geq S\ 0.0830\ A_o - 0.442 \qquad (2)$$

The linear ethylene polymers employed in the process of the present invention have significantly larger S values than do the linear ethylene polymers heretofore used in melt extrusion processes. The relationship between S and $A_o$ values for ethylene polymers prepared by polymerizing ethylene in the presence of a catalyst consisting of chromia supported on silica is defined by Formula 3:

$$S = 0.0813\ A_o - 0.47 \qquad (3)$$

FIG. 2 sets forth a graphic representation of Formula 1 and Formula 3. It will be observed that the two curves are generally parallel to each other, with the curve for Formula 1 lying to the right of the curve for Formula 3, and with the curve for Formula 3 having a somewhat steeper slope. FIG. 3 also sets forth the limiting value of Formula 2 when S is defined by the formula:

$$S = 0.0830 A_o - 0.442$$

The area defined by the lines joining A, B, C, D, and E includes the S and $A_o$ values for the ethylene polymers preferred for use in the process of the present invention.

In addition to having S and $A_o$ falling within the relationships above described, the ethylene polymers employed in the invention will have specified minimum and maximum S and $A_o$ values. Specifically such ethylene polymers will have S values in the range of about 0.61 to about 0.90 and $A_o$ values in the range about 12.0 to about 14.5 and preferably in a range of about 12.2 to about 14.0.

The practical significance of the S and $A_o$ values of the ethylene polymers employed in the invention is best seen by reference to FIG. 3 and FIG. 4. In FIG. 3 the melt flow curve of Polymer A, which has an S value of 0.65 and an $A_o$ value of 12.7, intersects the Constant Shear Stress Line of $3 \times 10^6$ dynes/cm$^2$ at a shear rate of approximately 420 sec.$^{-1}$. Polymer A can be extruded at shear rates of just under 420 sec.$^{-1}$ to produce extruded articles of excellent quality as subsequently described. Polymer X is an ethylene polymer prepared by polymerization of ethylene in the presence of a catalyst consisting of chromia supported on silica. Polymer X has an $A_o$ value substantially identical to Polymer A and has an S value of about 0.6. For this reason, Polymer X's melt flow curve intersects the constant shear stress line at an apparent shear rate of about 220 sec.$^{-1}$, which rate is considered to be too low to be used in commercial practice.

FIG. 4 is a plot of melt flow curves of Polymer A and Polymer $X^1$. Polymer $X^1$ is similar to Polymer X, previously described, but is prepared under somewhat different polymerization conditions so that at any apparent shear rate to the left of the Constant Shear Stress line, it has a somewhat lower melt viscosity than Polymer X. Polymer $X^1$ has an S value of about 0.5 and an $A_o$ value of about 12.2 The melt flow curve of Polymer $X^1$ intersects the constant shear stress line of $3 \times 10^6$ dynes/cm$^2$ at about 420 sec.$^{-1}$. Thus it is seen that both Polymer A and Polymer $X^1$ can be extruded at any shear rate of less than 420 sec.$^{-1}$ without exhibiting melt fracture. However, Polymer A has a significantly higher $A_o$ value and a significantly higher molecular weight than Polymer $X^1$. For this reason, articles of manufacture prepared by the melt extrusion of Polymer A will have significantly better strength properties than corresponding articles of manufacture prepared from Polymer $X^1$.

The following examples are set forth to illustrate more clearly the principle and practice of the invention. Where parts or percentages are set forth, they are set forth on a weight basis.

EXAMPLE I

PART A - PREPARATION OF CATALYST 7500 g (20 mols) of Al(NO$_3$)$_3$.9H$_2$O was dissolved in 50 liters of H$_2$O. To this solution was added 1150 g of 85% H$_3$PO$_4$ (10 mols) with stirring. A stock solution of NH$_4$OH was prepared by mixing 3 liters of concentrated 28% ammonium hydroxide with 3 liters of distilled water.

A stirred reaction vessel was charged with 10 liters of distilled water. To this distilled water was added the acidic solution of aluminum nitrate and phosphoric acid at a rate of approximately 500 ml per minute. The ammonium hydroxide solution was added simultaneously at a rate sufficient to maintain the pH at 8. The reaction zone was stirred vigorously to maintain good mixing of the solutions. After the addition of the acidic solution was completed, the reaction mixture was stirred for 10 minutes. The precipitated aluminum phosphate then was filtered and washed with 100 liters of water. The filter cake as removed from the filter contained 8.4 weight % solids.

A chromic acid solution was prepared by dissolving 40 g of CrO$_3$ in 300 cc water. This solution was mixed thoroughly with the above wet filter cake until a homogeneous slurry was obtained. The chromium content corresponds to approximately 1.2 wt % Cr based on the solids content. This homogeneous slurry was dried in a spray dryer and the dried product yield was 1469 g of powder.

The catalyst was activated by being heated to 760° C for a period of 5 hours while maintaining the catalyst in a fluidized condition by the passage of air through the fluidized bed. The air used for this purpose had been treated so that it had a dew point of less than −50° C. The finished catalyst was green in color. The color indicated that the valence state of the chromium has been reduced to less than 6.

PART B - POLYMERIZATION OF ETHYLENE

A small quantity of the catalyst of Part A was charged to a stirred polymerization reactor which then was placed in a heating jacket and heated to 110° C. A small quantity of dry, oxygen-free isobutane then was charged to the reactor, allowed to vaporize, and vented from the reactor to remove all traces of oxygen from the reactor. The reactor then was charged with 500 parts of isobutane and attached to a reservoir of polymerization grade ethylene gas maintained at a pressure of 3.5 megapascals (approximately 35 atmospheres). The reactor was in continuous open communication with the reservoir of ethylene gas with a flow meter being maintained in the ethylene line to measure the flow of gas to the reactor. During the charging period, the temperature of the vessel fell below 110° C, but the temperature was reestablished at about 110° C within a few minutes after the isobutane was charged to the reactor. Polymerization started almost immediately with no observable induction period. The polymerization was run for 90 minutes. The rate of polymerization was about 500 grams of polymer per gram of catalyst per hour. This product is Polymer A whose melt flow properties are reported in Example 2.

EXAMPLE 2

The melt flow characteristics of Polymer A and a commercially available high density linear polyethylene resin were determined at 190° C in a capillary rheometer operated under conditions of constant shear. The apparent melt viscosities of the resins at varying apparent shear rates were determined and are shown in Table I.

TABLE I

| Polymer | Apparent Melt Viscosity (1) | Apparent Shear Rate (2) |
| --- | --- | --- |
| Prior Art Polyethylene Resin | 164 | 1.5 |
|  | 112 | 3.0 |
|  | 70 | 7.4 |
|  | 48 | 14.8 |
|  | 33 | 29.6 |
|  | 20 | 74.1 |
|  | 13 | 148 |
| Polymer A | 181 | 3.0 |
|  | 98 | 7.4 |
|  | 63 | 14.8 |
|  | 38 | 29.6 |
|  | 22 | 74.1 |
|  | 14 | 148 |

(1) Poise $\times$ 10$^3$ at 190° C
(2) Sec. $^{-1}$

The melt flow properties of Polymer A are shown in FIG. 1. Polymer A has an S value of 0.65 and an $A_o$ value of about 12.7. The melt flow properties of the prior art polyethylene resin are not plotted, but this resin has an S value of 0.54 and an $A_o$ value of about 12.2.

EXAMPLE 3

Blown film of 2.5 mil gauge was prepared from Polymer A of Example 1. The film was extruded through a 1¾ inch extruder at a rate of 52 lbs/hr. employing a melt temperature of about 295° C, a pressure of about 5,600 psi, and a screw speed of 60 rpm. A blowup ratio of 3.8:1.0 was employed. Under these conditions, the shear stress on the polymer at the die orifice was less than $3 \times 10^6$ dynes/cm$^2$.

As a control, 2.5 mil gauge film was prepared from a prior art ethylene polymer prepared by a Particle Form Process employing a chromia on silica catalyst. This polymer had a melt index (ASTM 1238-70, Condition E), of 0.6. The extrusion conditions employed were those previously established as being optimum for this polymer. Specifically, the polymer was extruded at a rate of 31 lbs/hr. through the same 1¾ inch extruder employing a melt temperature of 222° C, a pressure of 4,000 psi, and a screw speed of 55 rpm. A blowup ratio of 2.5:1.0 was employed. Under these conditions, the shear stress on the polymer at the die orifice was less than $3 \times 10^6$ dynes/cm$^2$.

Several physical properties of the two films were measured and are set forth in Table II. In the table MD signifies a measurement in the machine direction, while TD signifies a measurement in the transverse direction.

TABLE II

| Property | Ethylene Polymer | |
|---|---|---|
| | Polymer A | Prior Art |
| Film Density, g/Cm (1) | 0.954 | 0.959 |
| Crystallinity, % (2) | 78.6 | 70 |
| Tensile at yield, psi, MD (3) | 3870 | 4400 |
| Tensile at yield, psi, TD (3) | 4125 | 3600 |
| Elongation at break, %, MD (4) | 475 | 200 |
| Elongation at break, %, TD (4) | 500 | 2 |
| Elmendorf Tear, g/mil, MD (5) | 54 | 18 |
| Elmendorf Tear, g/mil, TD (5) | 49 | 39 |
| Lart Impact at 26", g/mil (6) | 38 | 25 |

(1) ASTM D 1509
(2) Determined by Differential Thermal Analysis
(3) ASTM D882
(4) ASTM D882
(5) ASTM D1922
(6) ASTM D1709

The above data demonstrate that the film prepared by the process of the present invention is remarkably superior to the film prepared by the prior art process. It will be specifically noted that its measured properties in the machine and transverse directions are quite close to each other. This is a highly desirable feature in a film. The film prepared by the process of the present invention is significantly superior to its prior art counterpart with respect to elongation at break, Elmendorf tear, and dart impact, all of which are important film properties.

The gel content of blown film is determined by counting the gels in 240 in.$^2$ of the film and measuring the diameter of the gels observed. The film prepared from Polymer A contained fewer than 10 gels. Only one of these gels had a diameter between 1/64 inch and 1/32 inch, with the remaining gels having diameters smaller than 1/64 inch. The gel content of this film was actually lower than that observed with film prepared from good quality low density polyethylene resins. This observation is quite significant as it is recognized in the art that film prepared from low density polyethylene resins usually is substantially freer of gels than film prepared from linear ethylene polymers.

For comparison purposes, film prepared by prior art extrusion processes from linear ethylene polymers prepared by a Particle Form Process employing a chromia catalyst supported on silica typically will have well in excess of 40 gels per 240 in$^2$. Typically five of these gels will have diameters of 1/32 inch or more, 15 of these gels will have diameters between 1/64 inch and 1/32 inch, with the balance having diameters smaller than 1/64 inch.

The process of the invention provides significant advantages in the melt extrusion fabrication of virtually any type of article that conventionally is fabricated from high density linear ethylene polymers by extrusion processes. As compared with prior art processes of extruding high density linear ethylene polymers whose S and A$_o$ value lies to the left of Curve 1 of FIG. 2, the process of the invention gives higher rates of extrusion, or extruded articles of superior physical properties, or both.

The process of the invention is of particular value in the melt extrusion of film. As illustrated in Example 3, film prepared by the process of the invention has a superior balance of physical properties, particularly properties measured in the transverse direction. Such film also has few gels and higher crystallinity than obtained in prior art films.

The process of the invention also is of particular value in blow molding large articles such as drums and the like. Such blow moldings frequently will weigh in excess of three (3) pounds. In the fabrication of such articles a parison is extruded and subsequently expanded within a mold. Such large blow molded articles, when prepared by extruding the parison by the method of the invention, have superior physical properties. In addition, both the interior and exterior surfaces of the molded articles are significantly smoother than corresponding articles made by prior art processes.

It also has been noted that extruded pipe prepared by the process of the invention is superior to corresponding pipe made by prior art processes. In particular, the interior walls of such pipe have smoother surfaces and have less frictional resistance to liquid flow.

While the invention has been described with particular emphasis on the manufacture of extruded articles having superior physical properties of to those obtainable with prior art processes, the invention also provides lower manufacturing costs in the manufacture of extruded articles. The ethylene polymers employed in the process of the invention, by reason of their high S values, have extremely low apparent melt viscosities under the apparent shear rates employed in commercial extruders. Thus, in the operation of the process of the invention, high rates of extrusion are obtained at relative low rates of power consumption. These factors lead to low manufacturing costs.

In the description of the operation of the process, it has been noted that the extrusion is carried out at a shear stress of less than $3 \times 10^6$ dynes/cm$^2$; this being the shear stress at which melt fracture frequently occurs. It will be recognized that the process normally will be operated at the highest feasible shear stress while avoiding melt fracture to obtain high rate of extrusion and concomitant low manufacturing costs. The shear stress at which melt fracture occurs can be influenced by many factors, including die design and configuration. Accordingly, in some situations, the process of the invention can be carried out at a shear stress somewhat in excess of $3 \times 10^6$ dynes/cm$^2$ while still avoiding melt fracture.

The ethylene polymers employed in the practice of the present invention are prepared by a unique polymerization process described in the copending application of Robert W. Hill, William L. Kehl, and Thomas J. Lynch, Ser. No. 722,197, filed on Sept. 10, 1976, and assigned to the assignee of this application. The descriptions of that application are incorporated into the present application by reference. In brief, such ethylene polymers are prepared by polymerizing ethylene in a Particle Form Process in the presence of a chromium catalyst carried upon an inorganic carrier containing aluminum and phosphorous moieties. The inorganic carrier is prepared by dissolving aluminum cations and orthophosphate anions (in at 5:1 to 1:1 molar ratio) in a strongly acidic aqueous medium and precipitating the carrier therefrom by neutralizing the acidic aqueous medium.

Ethylene homopolymers prepared by the process described in Ser. No. 722,197 have densities of the order of 0.96 or higher. Certain ethylene copolymers, e.g., ethylene-hexene copolymers, prepared by this process have densities as low as about 0.94. The density values referred to herein are densities of annealed samples. With certain very high molecular weight ethylene polymers of the type employed in the present invention, difficulties are sometimes encountered in truly annealing polymer samples. In such situations, the highest measured density is considered to be the annealed density.

I claim:

1. A process for preparing a melt extruded article of manufacture having improved physical properties which consists essentially of preparing such article by melt extruding a linear ethylene polymer at a shear stress of less than about $3 \times 10^6$ dynes/cm$^2$, said ethylene polymer being characterized by:
    (a) having an annealed density of at least about 0.96 gms/ml,
    (b) having melt flow properties such that the relationship between its slope parameter (s) and its apparent melt viscosity in poises at 1 sec.$^{-1}$($A_o$) is defined by the formula:

$$S \geq 0.0830 A_o - 0.442$$

where S is the negative slope of the curve obtained from a plot of the natural logarithm of the polymer's apparent viscosity in poises versus the natural logarithm of the apparent shear rate in sec.$^{-1}$; and where $A_o$ is the natural logarithm of the polymer's apparent viscosity in poises measured at 1 sec.$^{-1}$ at 190° C;
    (c) having an $A_o$ value in the range of about 12.0 to about 14.5; and
    (d) having an S value in the range of about 0.61 to about 0.90.

2. A process of claim 1 in which the ethylene polymer has an $A_o$ value in the range of about 12.2 to about 14.0.

3. A process for preparing an ethylene polymer film which has values for elongation at break measured in the machine direction and in the traverse direction that are similar and which has a low gel content, nearly all of such gels having diameters of less than 1/32 inch, which process consists essentially of blow extruding a linear ethylene polymer through annular die at a shear stress of less than about $3 \times 10^6$ dynes/cm$^2$, said ethylene polymer:
    (a) having an annealed density of at least about 0.96 gms/ml.
    (b) having melt flow properties such that the relationship between its slope parameter S and its apparent melt viscosity in poises at 1 sec.$^{-1}$ $A_o$ is defined by the formula:

$$S \geq 0.0830 A_o - 0.442$$

where S is the negative slope of the curve obtained from a plot of the natural logarithm of the polymer's apparent melt viscosity in poises versus the natural logarithm of the apparent shear rate in sec.$^{-1}$ at 190° C, said slope measured at 10 sec.$^{-1}$; and where $A_o$ is the natural logarithm of the polymer's apparent viscosity in poises measured at 1 sec.$^{-1}$ at 190° C;
    (c) having an $A_o$ value in the range of about 12.0 to about 14.5; and
    (d) having an S value in the range of about 0.61 to about 0.90.

4. A process of claim 3 in which the ethylene polymer has an $A_o$ value in the range of about 12.2 to about 14.0.

5. A process for preparing a large blow molded article having improved physical properties which consists essentially of extruding a parison of a linear ethylene polymer at a shear stress of less than about $3 \times 10^6$ dynes/cm$^2$ into a mold, clamping the parison in the mold, and injecting gas into the parison to expand the parison to conform to the walls of the mold, said ethylene polymer:
    (a) having an annealed density of at least about 0.96 gms/ml,
    (b) having melt flow properties such that the relationship between its slope parameter S and its apparent melt viscosity in poises at 1 sec.$^{-1}$ $A_o$ is defined by the formula:

$$S \geq 0.0830 A_o - 0.442$$

where S is the negative slope of the curve obtained from a plot of the natural logarithm of the polymer's apparent melt viscosity in poises versus the natural logarithm of the apparent shear rate in sec.$^{-1}$ at 190° C, said slope measured at 10 sec.$^{-1}$; and where $A_o$ is the natural logarithm of the polymer's apparent viscosity in poises measured at 1 sec.$^{-1}$ at 190° C;
    (c) having an $A_o$ value in the range of about 12.0 to about 14.5; and
    (d) having an S value in the range of about 0.61 to about 0.90.

6. A process of claim 5 in which the ethylene polymer has an $A_o$ value in the range of about 12.2 to about 14.0.

* * * * *